(12) United States Patent
Conley, Jr. et al.

(10) Patent No.: US 6,434,745 B1
(45) Date of Patent: Aug. 13, 2002

(54) CUSTOMIZED WEB BROWSING AND MARKETING SOFTWARE WITH LOCAL EVENTS STATISTICS DATABASE

(75) Inventors: Ralph F. Conley, Jr.; Jeffrey A. Maier, both of Miamisburg, OH (US)

(73) Assignee: Direct Business Technologies, Inc., Centerville, OH (US)

( * ) Notice: Subject to any disclaimer, the term of this patent is extended or adjusted under 35 U.S.C. 154(b) by 0 days.

(21) Appl. No.: 09/396,667

(22) Filed: Sep. 15, 1999

(51) Int. Cl.[7] .............................................. G06F 9/445
(52) U.S. Cl. ...................... 717/177; 717/174; 345/738; 707/10
(58) Field of Search .................. 717/11, 174, 175–178; 705/10, 7; 380/242; 709/219; 345/749, 756, 760, 763, 789, 811, 968, 738; 707/10, 3; 710/104

(56) References Cited

U.S. PATENT DOCUMENTS

| | | | |
|---|---|---|---|
| 5,742,768 A | | 4/1998 | Gennaro et al. .................... 1/1 |
| 5,778,367 A | | 7/1998 | Wesinger, Jr. et al. ........ 707/10 |
| 5,790,785 A | | 8/1998 | Klug et al. .................. 713/202 |
| 5,796,952 A | | 8/1998 | Davis et al. ................. 709/224 |
| 5,799,284 A | | 8/1998 | Bourquin ...................... 705/26 |
| 5,838,910 A | | 11/1998 | Domenikos et al. ........ 709/203 |
| 5,838,916 A | | 11/1998 | Domenikos et al. ........ 709/219 |
| 5,845,299 A | | 12/1998 | Arora et al. ................. 707/513 |
| 5,848,396 A | * | 12/1998 | Gerace ........................ 705/10 |
| 5,848,427 A | | 12/1998 | Hyodo ....................... 707/513 |
| 5,854,897 A | | 12/1998 | Radziewicz et al. ........ 709/224 |
| 5,870,552 A | * | 2/1999 | Dozier et al. ............... 709/219 |
| 5,991,735 A | * | 11/1999 | Gerace ........................ 705/10 |
| 6,115,471 A | * | 9/2000 | Oki et al. .................... 380/242 |
| 6,119,186 A | * | 9/2000 | Watts et al. ................. 710/104 |
| 6,144,962 A | * | 11/2000 | Weinberg et al. ............. 707/10 |
| 6,202,062 B1 | * | 3/2001 | Cameron et al. .............. 707/3 |
| 6,356,905 B1 | * | 3/2002 | Gershman et al. ............ 707/10 |

\* cited by examiner

Primary Examiner—Gregory Morse
Assistant Examiner—Hoang-Vu Antony Nguyen-Ba
(74) Attorney, Agent, or Firm—Steven J. Rosen

(57) ABSTRACT

The invention includes customized software to be used on an end-user computer having fixed storage and an interface with a network server using a network. A GUI component controls a browser which accesses publisher content that is at least partially installed on the fixed storage. Software is provided for monitoring end-user behavior, on-line and off-line, and maintaining a local event statistics database of the end-user behavior including event data related to end-user events. Software is provided for detecting a network connection and transmitting at least a portion of the local event statistics database to the network server. Software is provided for compiling summary information from the local event statistics database wherein the summary information comprises the portion of the local event statistics database. E-mail grabbing software automatically examines each URL loaded in the browser and locates and saves E-mail addresses, URL, title pages, last modified date, and any keywords present in a <META> tag of the E-mail URL to a searchable local E-mail database on the end-user's computer. An analysis program on the network server receives and analyzes local event data from the local event statistics databases and stores results from the analysis program into a statistics database on a statistics server accessible through the network server.

47 Claims, 17 Drawing Sheets

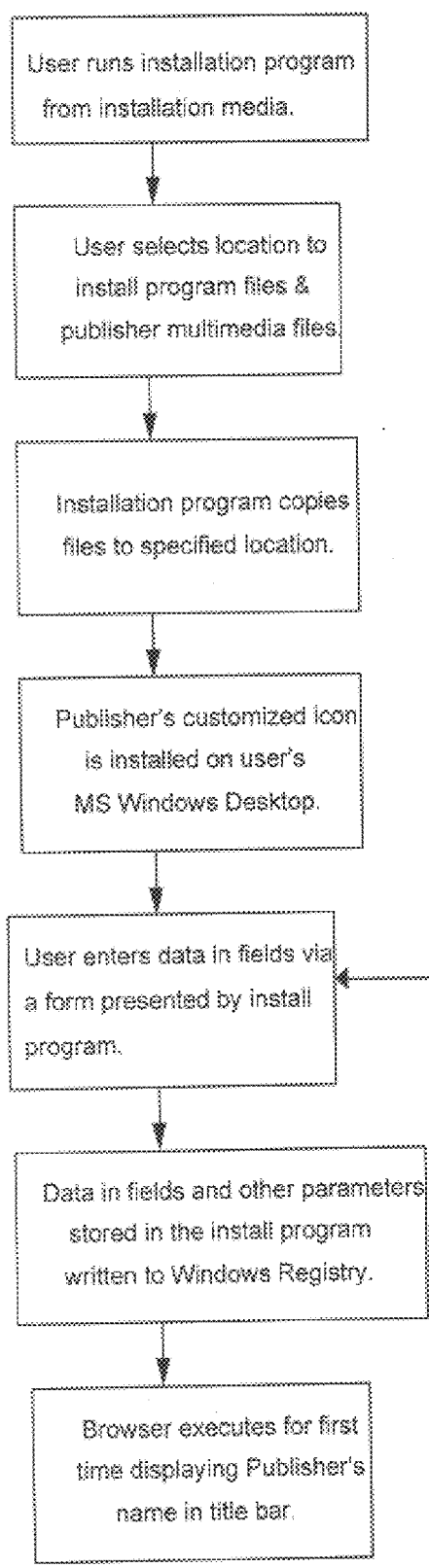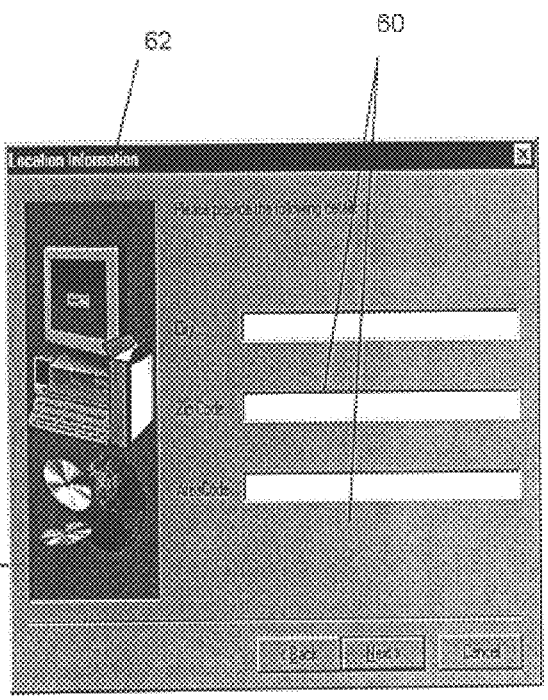
Fig 2

| Event Statistics File | File Header |
|---|---|
| AB1123-11233-FZ99000<br>142599-333-1998-0010001<br>VER4411-99000000<br>identifier<br>45438-2599<br>937 | unique browser identifier<br>unique publisher identifier<br>unique product manufacturing lot<br><br>zip code of user<br>area code of user |
| First session record | Beginning of First Record |
| <Session 1><br>browser<br>12/05/1998 1:00:05 PM<br>23<br>file://c:/multimedia/tripslides.ani<br>URLs viewed<br>http://www.yahoo.com | data for 1 user session with<br><br>date/time session begun<br>elapsed minutes used<br>listing of local files & WWW |
| Second session record | End of First Record<br>Beginning of Second Record |
| <Session 2><br>12/06/1998 8:15:31 AM<br>44<br>http://www.snap.com<br>http://www.nytimes.com/default.asp<br>http://www.altavista.com<br>file://c:/anthem demo/main.htm | |

CUSTOMIZED WEB BROWSING AND MARKETING SOFTWARE WITH LOCAL EVENTS STATISTICS DATABASE

BACKGROUND OF THE INVENTION

1. Field of the Invention

The present invention relates generally to browser software to access the World Wide Web (WWW) and, more particularly, to customizable browser software to access the Web and multi-media files and applications on an end-users computer and provide marketing data about the end-user.

2. Discussion of the Background Art

Business marketing is very desirable of targeting their customers needs and interests as part of their effort to sell products and services. The advent of the global network termed the Internet, called the World Wide Web (WWW or WEB) has opened up an entire new medium for marketing in conjunction with entertainment, educational and business information and services available to end-users. Marketing goals on the Internet, as is true elsewhere, is to collect useful information about potential or actual customers and to provide customers with useful tools, applications, and information to enhance the customers dealings with the business. Such information and tools can lead to future sales. From an end-user's viewpoint, visiting a myriad of websites is interesting, but, the only way to store such sites is to store them in a bookmark list which is not searchable and often is long and unwieldy and does not help the end-user to return to that site.

Businesses market products and services by advertising such as by placing a classified advertisement on a computer database system. These networks and on-line services like Prodigy and AOL offer these classified services. These systems usually place the advertisement into a category or sub-categories. This method allows the client (client is interchangeable with end-user, workstation, terminal or browser and server is interchangeable with host or mainframe) of the system to browse through a certain category to view the classified advertisement. Some systems will even allow the client to search for keywords in the subject of the classified advertisement. These types of systems dont't target customers well enough to increase the customer's interest or opportunity to view, participate in the business's marketing research, and targeted advertising efforts. It is, therefore, highly desirable to have a seamless and easy system of gathering marketing information based on the end-user's or customer's browser use both on-line when connected to a network such as the World Wide Web (Internet) or intranet and off-line when not connected to a network. It is also desirable to provide up to date sales and marketing information and useful utilities and functions as well as advertising information to the customer in a fashion that will not interfere with the end-user's operations, will not unnecessarily use his time, and will enhance the customer's experience of using the Internet and encourage the end-user to use the browser.

SUMMARY OF THE INVENTION

Customizable software is stored in machine readable format for distribution by a third party publisher to be used by an end-user on an end-user computer having a fixed storage means and interface with a web server using a network. The software is stored electronically, typically, in a compressed format and loaded onto the end-user computer. A preferred embodiment of the software includes a graphical user interface (GUI) component for controlling a browser on the end-user computer. The GUI is installed on the end-user computer with an installation software program and the GUI includes means for displaying at least one customized screen display area on the end-user computer which is customized for the publisher third party. The customizable software includes publisher content that is at least partially installable on the end-user's computer. The publisher content preferably includes multi-media files.

The installation software program includes means for installing a customized icon operable to launch the GUI such that the icon is viewable on a start-up screen on the end-user's computer. The software further includes a means for changing a name of the browser that appears in a title bar on a viewable screen on the end-user's computer.

The software includes a means for monitoring end-user behavior and maintaining a local event statistics database of the end-user behavior including event data related to end-user events. Such end-user behavior includes end-user behavior on-line and viewing locally stored files on the end-user computer off-line. The software includes a means for detecting a network connection and transmitting at least a portion of the local event statistics database to the web server. The software includes a means for compiling summary information from the local event statistics database wherein the summary information comprises the portion of the local event statistics database.

The end-user events includes logging-on to URLs and the end-user event data includes at least one of a title, a last modified date, a keyword located in a <META> tag, and submitted data via an HTML <FORM> including end-user data entered by the end-user in data fields of the form and an entry date and an entry time the end-user event occurred. A graphing means provides graphical representations of the end-user event data stored in the local events statistics database.

The software includes a means for detecting a network connection during program start-up and executing a transaction with the web server to determine if the publisher content should be modified. The software further includes a means for updating the publisher content that is installed on the end-user's computer. Updating the publisher content includes downloading new files from the server and storing them on the end-user's computer and deleting existing files which are stored on the end-user's computer. The transaction with the web server includes transmitting at least one of a set of identifying data, the set of identifying data comprised of a unique identifier for the browser, a zip code of the end-user, an area code of the end-user, a set of keywords, and end-user demographic data. A search means is provided for allowing the end-user to search the events statistics database to locate Web pages which contain the keywords in a URL, Title, or as a keyword in a <META> tag.

A password manager means allows the end-user to record a script of a sequence of keystrokes performed to log-in to a password secured URL, to save the script to a local script database, generate a log-in script which the browser will run whenever it detects the end-user navigating to the password secured URL with a defined script, and automatically log the end-user in to the password secured URL.

The software includes an E-mail grabbing means for automatically examining each URL loaded in the browser to locate E-mail addresses and save the Email address, the URL, the title of the page of the URL, the URL's last modified date, and any keywords present in a <META> tag of the URL to a searchable local E-mail database on the end-user's computer. An E-mail interface means allows the end-user to search the E-mail database with one or more search terms and display E-mail information for E-mail addresses stored in the E-mail database which satisfy a query. The E-mail interface also allows the end-user to click-on a displayed E-mail address and invoke a default E-mail program stored on the end-user's computer to send an E-mail to the displayed E-mail address. The E-mail interface includes a button to activate a reporting means for saving the E-mail information to an E-mail file.

The software includes an image grabbing means for allowing the end-user to selectively save an image with an image associated URL displayed on the end-user's computer into a searchable image database. A title of the page of the URL, a last modified date of the URL, and keywords in a <META> tag of the URL are also stored in searchable fields in the image database.

A touring means allows the end-user to selectively save tours, each tour having a plurality of tour URLs, in a searchable tour database. A tour launching means for launching a selected one of the tours sequentially downloads each of the tour URLs included in the selected tour in a background process in which each of the sequentially downloaded tour URLs can be displayed by the end-user.

A fast site install means is used to install fast site command buttons to a command bar on a display screen of the browser by the end-user entering a URL and a short name to appear on the fast site command buttons and elects to save their entry.

A content decoding means allows the end-user to selectively view information about encrypted portions of the publisher content stored on the distributed storage media. The content decoding means includes a password protection component for selectively decrypting and storing the encrypted portions when the end-user enters a password supplied by the third party publisher.

An analysis program on a statistics server connected to the web server receives and analyzes local event data from said local event statistics databases and stores results from said analysis program into a statistics database accessible through the web server. The said analysis program includes a means for compiling summary information from said results which may be in a graphical format.

ADVANTAGES OF THE INVENTION

The present invention has the ability to track end-user use both on-line and off-line for business marketing reports, thus, allowing the publisher to better target customers needs and interests as part of the publisher's effort to sell products and services. The present invention allows the end-user to access publisher's marketing information while off-line and allows the publisher to update the marketing information stored on the end-users computer (PC).

Another advantage of the present invention is its ability to provide the end-user with a website searchable database that helps the end-user to return to stored sites. Another advantage is that the publisher can analyze marketing data from one or all or any portion of the end-users who use the publisher distributed customized copies the browser software of the present invention. The present invention provides a seamless and easy system of gathering marketing information based on the end-user's or customer's browser use both on-line when connected to a network such as the World Wide Web (Internet) or intranet and off-line when not connected to a network. The present invention provides up to date sales and marketing information to the end-user and useful utilities and functions as well as advertising information to the customer in a fashion that will not interfere with the end-user's operations and encourages the use of the publisher's distributed browser. The end-user is further enticed to use the publisher's browser and hence provide marketing information to the publisher because it does not unnecessarily use the end-user's time and enhances the end-user's experience of using the Internet and encourage the end-user to use the browser.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

FIG. 2 is a flow diagram illustrating the operation of the installation feature of browser software in the present invention;

FIG. 5 is an illustration of an example of entries in an event statistics database illustrated in FIG. 1;

FIG. 12 is an illustration of a screen display of an E-mail searching component;

DETAILED DESCRIPTION

Figure 1:
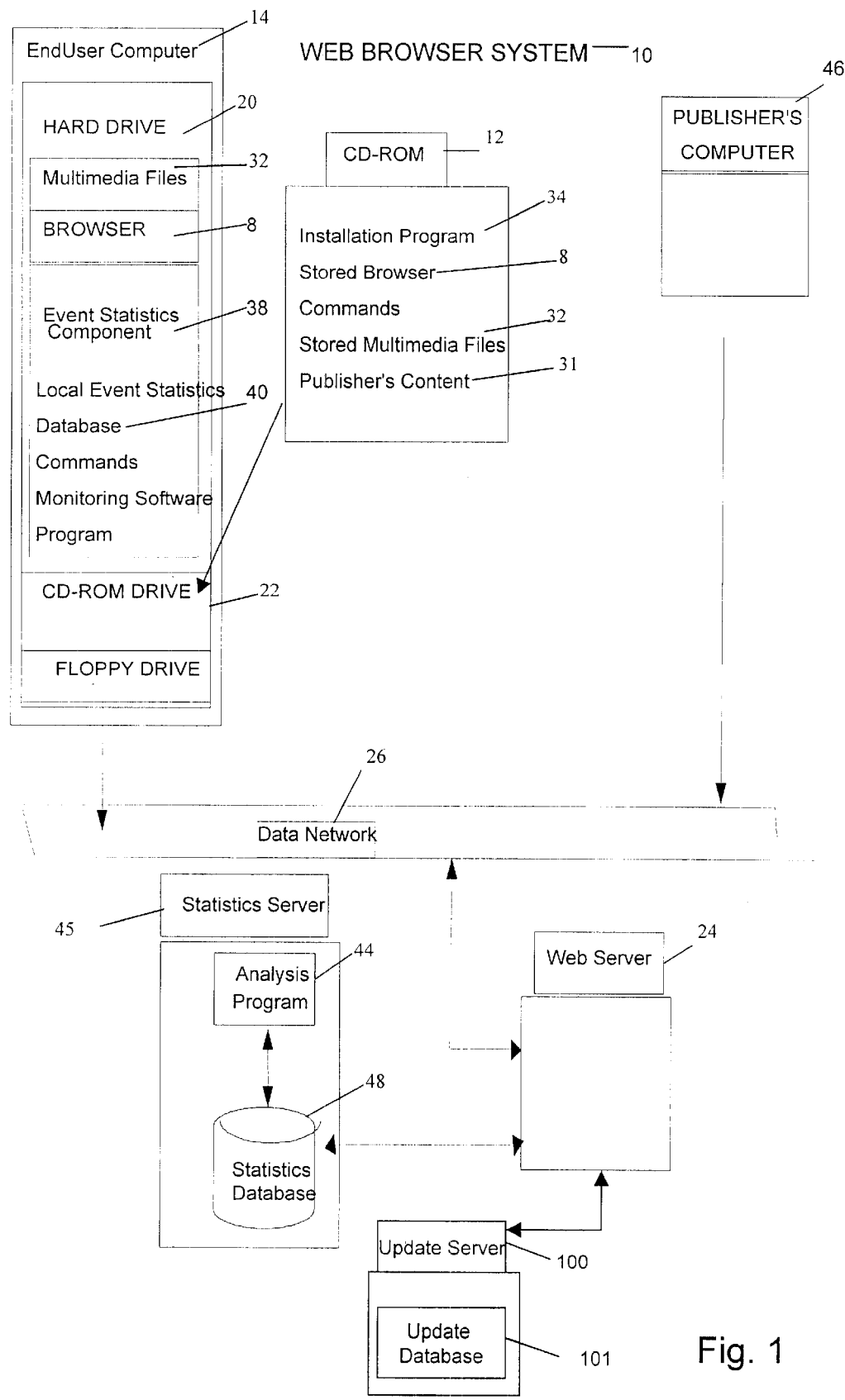
FIG. 1 is a block diagram showing a customizable Web browser system for collecting marketing information associated with end-users in accordance with an exemplary embodiment of the present invention.

Illustrated in FIG. 1 is a block diagram of the customizable Web browser system 10 of the present invention which includes computer software and hardware. A Web browser 8 is stored on and installable from a distribution means such a storage media such as a CD-ROM 12 for distribution by a third party publisher such as a business. The web browser software 8 is used by an end-user on an end-user computer 14 which is typically a PC or personal computer. The end-user computer 14, typically, includes a fixed storage means such as a hard disk drive 20 and a removable storage means such as a floppy disk drive or a CD-ROM drive 22 for retrieving files from the CD-ROM 12. The end-user computer 14 interfaces with a network server such as a web server 24 through a network 26 such as the Internet with a modem or direct connect to the network server or another type of network such as a LAN or intranet. Other software stored on distributable storage media includes publisher's content 31, in the form of multi-media files 32, and an installation program 34 for installing the browser 8 and at least some of the multi-media files 32 on the hard drive 20 of the end-user computer 14. The distribution means also includes, but is not limited to floppy diskettes, CD_DVD, and via transfer over an electronic data network to end-users. Typically, the software is stored in a compressed format on the CD-ROM 12.

Figure 3:
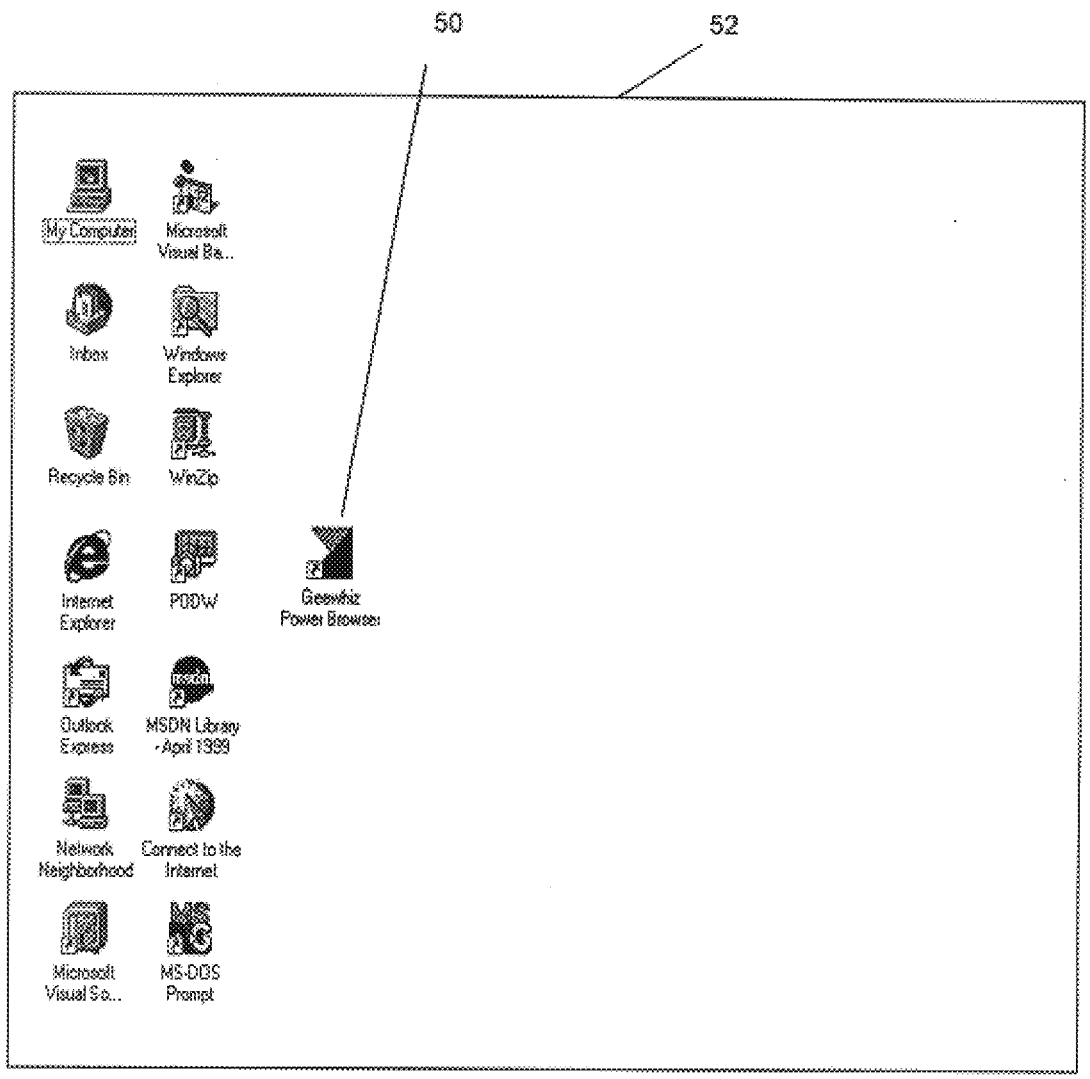
FIG. 3 is an illustration of a GUI screen in MS Windows Desktop.

An installation program stored on the CD-ROM 12 is used by end-user to install the browser 8 and automatically stores publisher's content on the hard drive 20 on the end-user computer 14. The publisher's content stored on the hard drive 20 is accessible by the end-user with using the browser 8 which can use and display the content stored on either or both the hard drive and the CD-ROM. The installation program also installs a customized icon on a graphical end-user interface (GUI) which appears on the screen of the end-user computer 14 as illustrated in FIG. 3.

The publisher's content includes many types of files such as electronic documents, multi-media files, ActiveX objects, plug-ins for publication on a CD-ROM, video files, audio files, graphic files, Flash files, Shockwave files etc., JAVA applets, ActiveX controls and HTML files. The browser 8 is software having many functional components as described below. The browser is preferably an object oriented computer code used by many software programmers. The components are computer codes that may be written as computer programs or sub programs or subroutines of computer programs as well as object code.

The browser includes an event statistics component 38 which is software for monitoring end-user behavior and maintaining a local event statistics database 40 of end-user behavior on the end-user computer 14 and, preferably, on the hard drive 20. The end-user behavior is determined by monitoring events that occur while the end-user uses the browser. The event data is stored in the end-user computers 14 and is automatically transmitted by the browser to the web server 24 when the end-user computer 14 is connected to the network 26. The end-user behavior is monitored any time the end-user uses the browser both on-line when connected to a network such as the World Wide Web (Internet) or intranet and off-line when not connected to a network.

An analysis program 44 on the a statistics server 45 connected to the web server 24 receives the information from the local event statistics database 40 through the web server and analyzes it and puts the results into a publisher's statistics database 48. The analysis program 44 includes means for compiling summary information from the various local event statistics databases 40 of different end-users and storing the compiled information is the publisher's statistics database 48. A publisher's computer, which is also typically a PC or personal computer, accesses the web server 24, preferably through the network 26, to request statistical and other types of reports and other information about his end-users' behavior. These reports are produced by the analysis program 44 using the summary information and other data from the publisher's statistics database 48. Typically, the end-users are customers and potential customers of the publisher. The system, of course, may be used by many publishers for many different sets of end-users. The publisher's statistics database 48 and the analysis program 44 are preferably located on the statistics server 45 that is connected to the web server 24 so that the publisher's statistics database 48 and the analysis program 44 can be accessed through the network 26.

The flow diagram in FIG. 2 illustrates the installation feature of the browser software 8. The end-user runs the installation program 34 located on the CD-ROM 12. The end-user selects a location on the hard drive 20 to install the web browser 8 and all of its attendant files including various utilities described below and the publisher's multi-media files 32. The installation program 34 installs files to the specified location and installs a customized icon 50 which appears on a GUI screen 52 on the end-user computer 14 such as is illustrated for MS Windows Desktop 54 in FIG. 3. The end-user enters marketing information such as zip code and area code in designated data fields 60 via an input form 62 presented by the installation program as shown in FIG. 2. This data and other parameters are stored in the install program written to the end-user's computer 14 Windows Registry.

Figure 4:
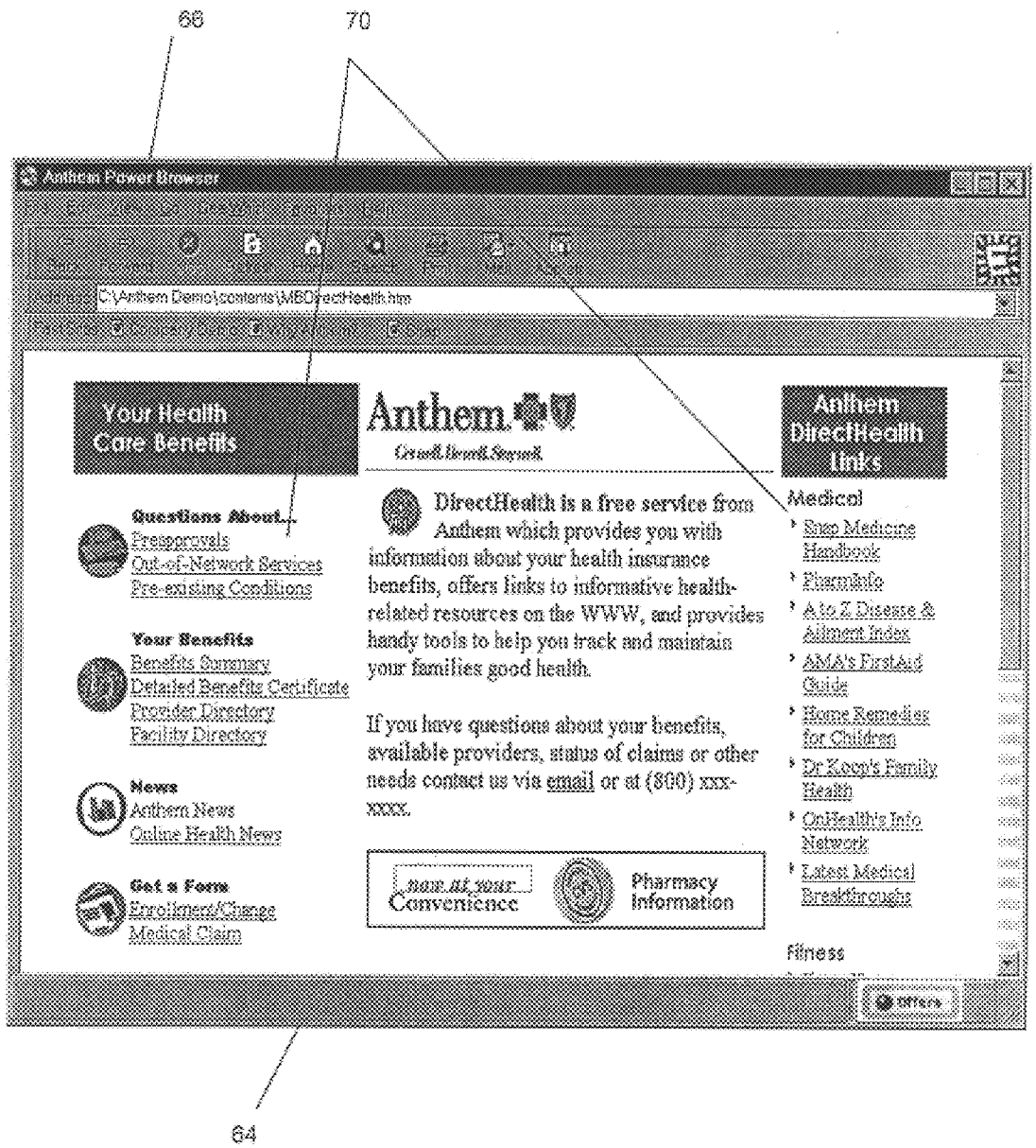
FIG. 4 is an illustration of main screen of the browser in FIG. 2.

Referring to FIG. 4, the browser then executes for first time displaying the browser's main screen 64 with the publisher's name in title bar 66, while the end-user computer 14 is not connected to the network. All or some of the multi-media files are accessible from the main screen 64 as illustrated in FIG. 4 by the use of LINKS. Links 70 to various sites on the network 26, CD-ROM 12 (or CD_DVD) or CD-ROM drive 22 are also accessible from the main screen 64.

The browser 8 includes event statistics software to monitor end-user behavior and maintain the local event statistics database 40 which details certain end-user events such as when a HMTL page is accessed. An example of entries in the local event statistics database 40 is illustrated in FIG. 5. The local event statistics database 40 includes at least one Events Statistics File having a header at the beginning of the file. Each record is appended in time of event sequence. The event statistics software searches every HMTL page and records (A) a URL, Title, Last Modified Date, and any keywords located in <META> tags; (B) any data submitted via an HTML <FORM> including the URL and Title of the page containing the form and the data entered by the end-user for each data field of the form; and (C) the date and time the event occurred. Event behavior is monitored and end-user events recorded when the end-user is both connected to a remote network for browsing (on-line) and when viewing files which are stored locally (off-line).

Figure 6:
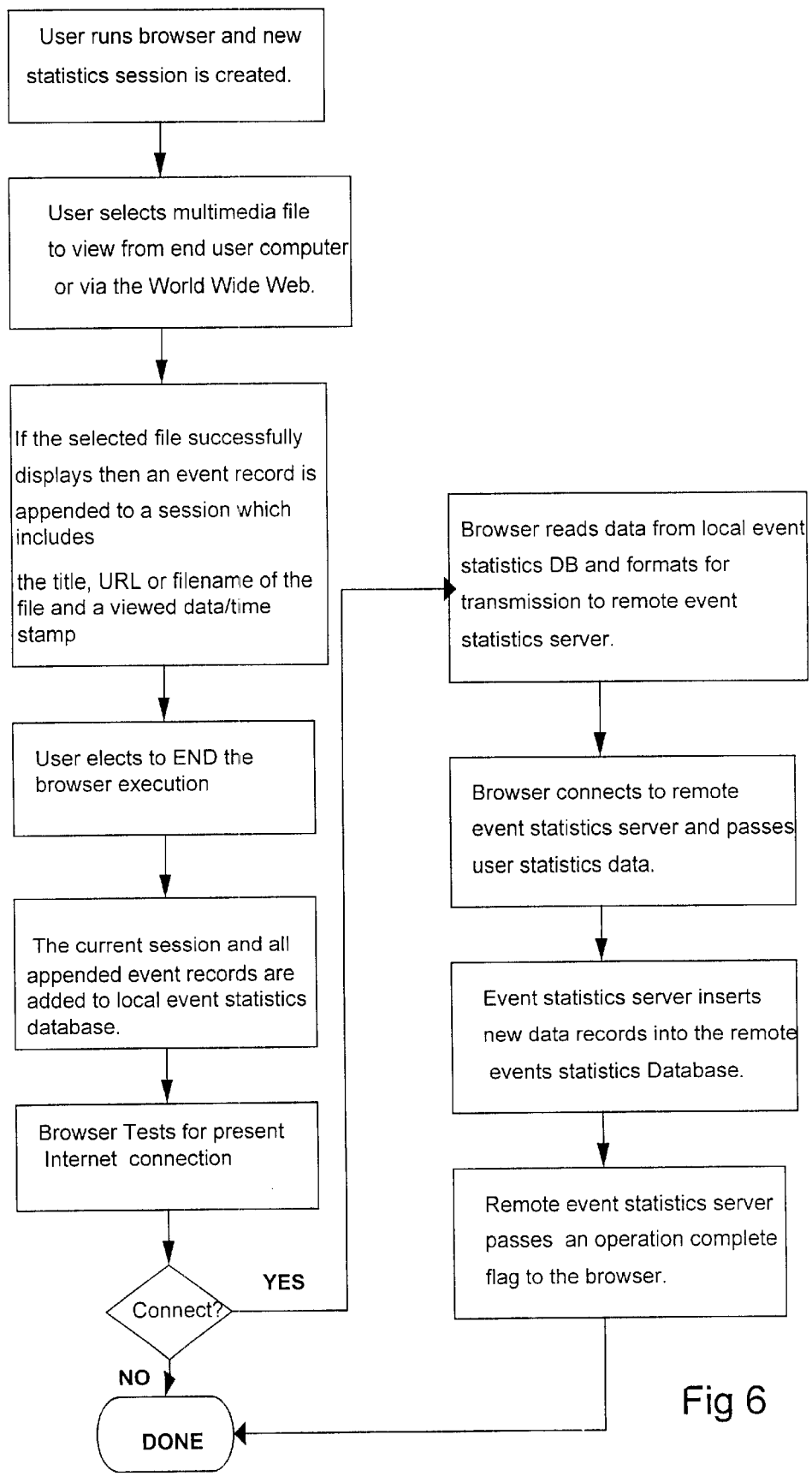
FIG. 6 is a flow chart illustrating a reporting component of the browser for monitoring and reporting of a local event statistics database to a web server in FIG. 1.

FIG. 6 is a flow chart illustrating a reporting component of the browser 8 for monitoring and reporting of the local event statistics database 40 to the web server 24. Each time the end-user runs the browser 8 reporting code creates a new statistics session. During the operation of the browser 8, the end-user selects to view a multi-media file from the end-user computer 14, either from the hard disk drive 20 or the CD-ROM drive 22, or through the network 26 such as the World Wide Web (WWW). If the selected multi-media file successfully displays, then an event record is appended to a session which includes the title, URL or filename of the file and a viewed data/time stamp. When the end-user elects to end the browser execution, the current session and all appended event records are added to local event statistics database. The browser 8 then tests for the presence of a network connection such as an internet connection. If the browser 8 detects such a connection, it reads data from the local event statistics database (DB) and formats the data for transmission to the remote web server 24. The browser 8 then connects to the web server 24 and transmits the end-user statistics data to the statistics server 45 connected to the web server. The statistics server 45 inserts the newly transmitted end-user statistics data records into the publisher's statistics database 48. The statistics server 45 then transmits an operation complete flag back across the network to the browser 8. If the browser 8 doesn't detect such a connection, it will transmit the stored and un-transmitted end-user statistics data to the statistics server 45 for insertion into the publisher's statistics database 48 next time such a connection is detected.

Figures 7A, 7B:
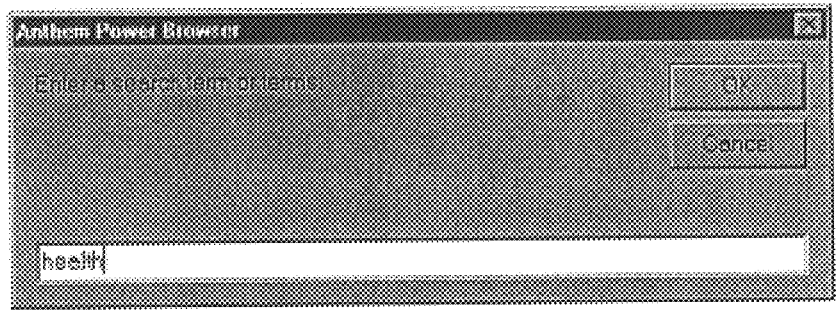
FIG. 7A is an illustration of a screen display of an events statistics search component of the browser.
FIG. 7B is an illustration of a screen display of results of the statistics search illustrated in FIG. 7A.

FIG. 7A is an illustration of a screen display of an events statistics search component of the browser 8 has for allowing the end-user to search the events statistics database using a keyword or search term. The events statistics search component displays a search form that allows the end-user to enter one or more keywords and search the events statistics database to locate Web pages which contain the keywords in their URL, Title, or as a keyword in a <META> tag. FIG. 7B is an illustration of a screen display of results of the statistics search illustrated in FIG. 7A.

Figure 8:
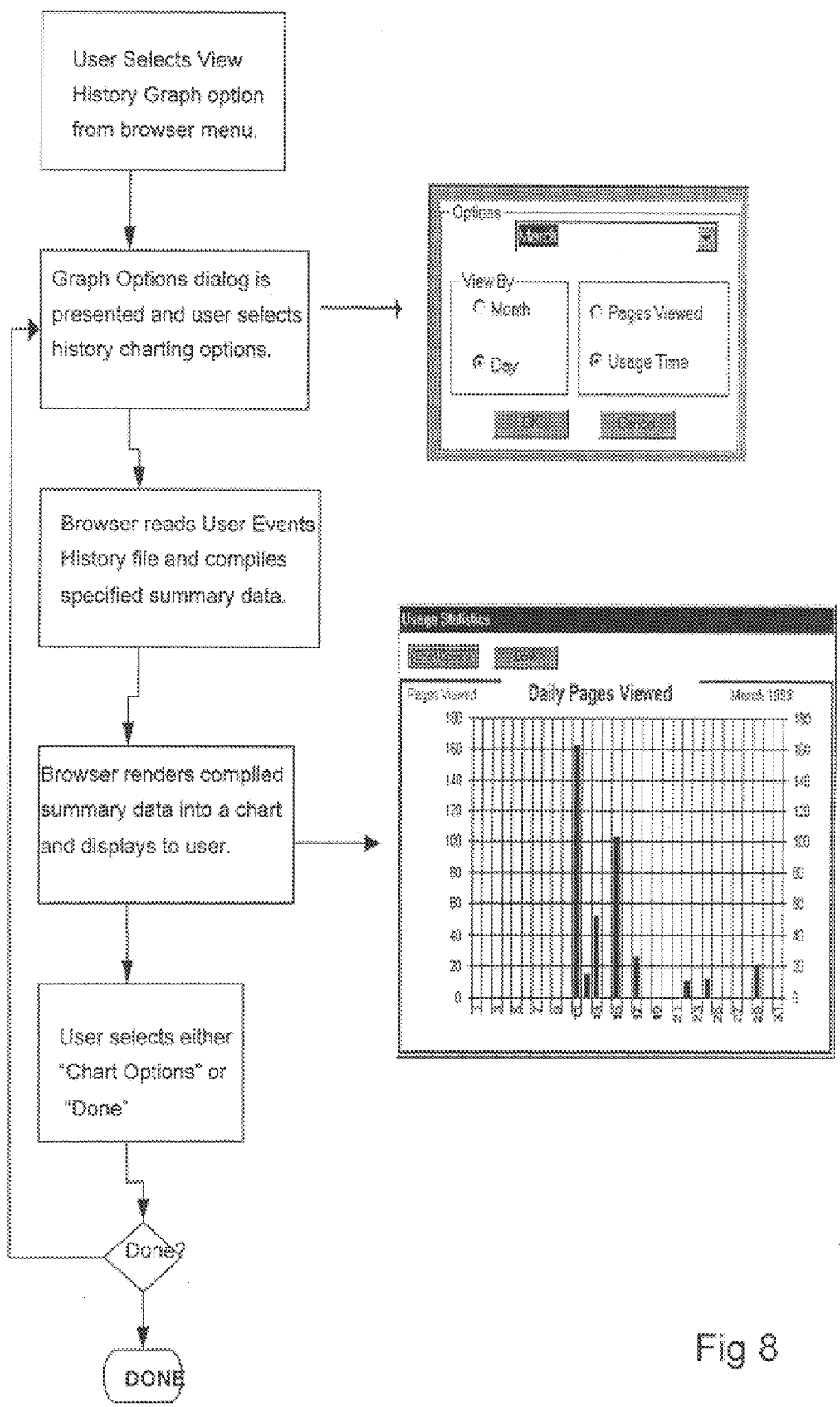
FIG. 8 is a flow chart illustrating an events statistics report component of the browser for allowing the end-user to display graphical representations of the event data stored in the local events statistics database.

FIG. 8 is a flow chart illustrating an events statistics report component of the browser 8 for allowing the end-user to display graphical representations, such as graphs and charts, of the event data stored in the local events statistics database. The graphical representations, such as the chart labeled "Usage Statistics" in FIG. 8, can show information that is organized monthly or daily within a month, including time the browser was used, number of URLs viewed, and the most frequently viewed URLs.

Figure 9:
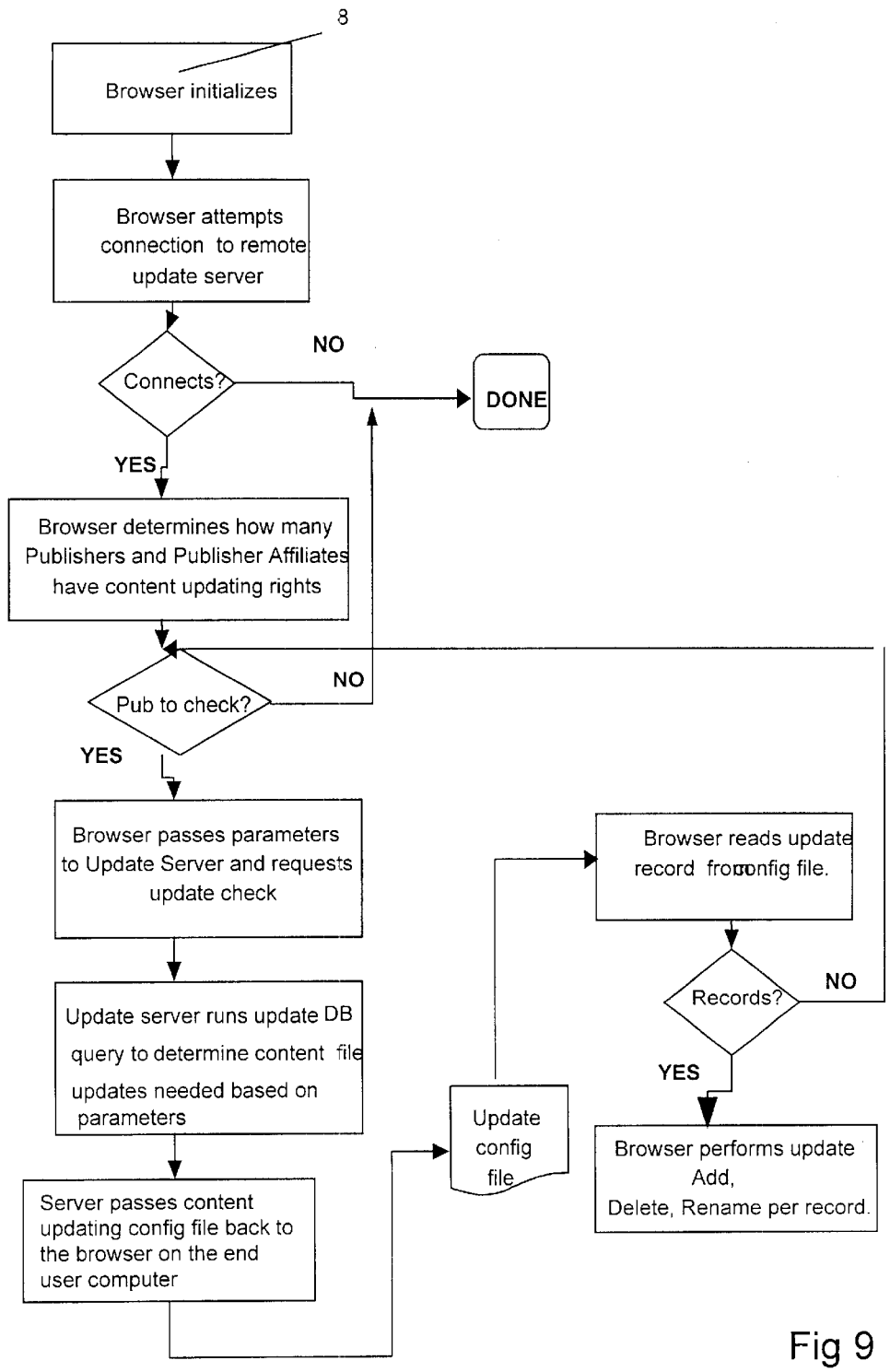
FIG. 9 is a flow chart illustrating an updating component of the browser for updating publisher's content stored on the end-user computer.

FIG. 9 is a flow chart illustrating an updating component of the browser 8 for updating the publisher's content 31 stored on the end-user computer 14 such as on the hard disk drive 20. Updating code detects the presence of a connection to the remote network during start-up of the browser 8 and executes a transaction to the web server 24 to determine if the stored publisher's content should be modified. During the transaction, the browser 8 passes information to the web server 24 such as a unique identifier for the browser, a zip code, area code, set of keywords, and demographic data about the end-user. The web server 24 passes the information received from the browser 8 to the update server 101 via a transaction and the web server 24 receives from the update server 101 a set of updating instructions. The customized icon 50 may be updated as well and publisher's may be changed which might warrant an update or change of the icons.

The browser 8 also executes any updating instructions provided by the web server 24 including downloading new files from the web server, storing the new files locally on the end-user computer 14, and deleting existing files which are locally stored. The updating instructions are caused to be generated by the publisher by accesses a publishers content updating program through the web server 24. The publisher transfers new multi-media files and instructions for their installation such as to which end-users and instructions for deleting unwanted multi-media files stored on end-user computers 14.

Figures 10, 11:
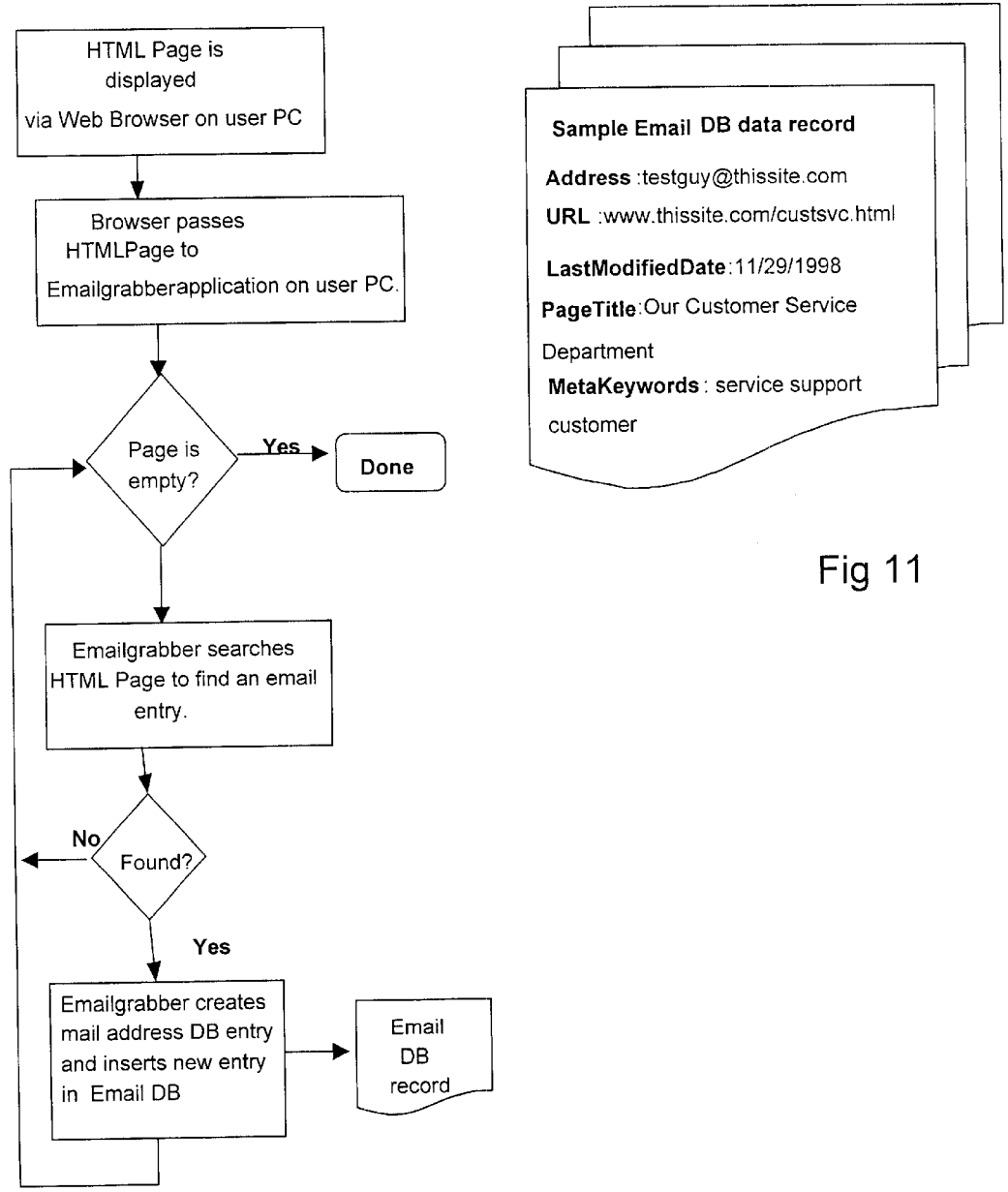
FIG. 10 is a flow chart illustrating an E-mail grabbing component of the browser for automatically examining each URL loaded in the browser to locate any E-mail addresses.
FIG. 11 is an illustration of an exemplary E-mail DB record.

FIG. 10 is a flow chart illustrating an E-mail grabbing component of the browser 8 for automatically examining each URL loaded in the browser to locate any E-mail addresses. When an E-mail address is located, that E-mail address, the URL, the title of the page, the URL's last modified date, and any keywords present in a <META> tag are automatically saved to a local E-mail database in the form of an E-mail DB (database) record as illustrated in an exemplary E-mail DB record in FIG. 11.

Figure 12:
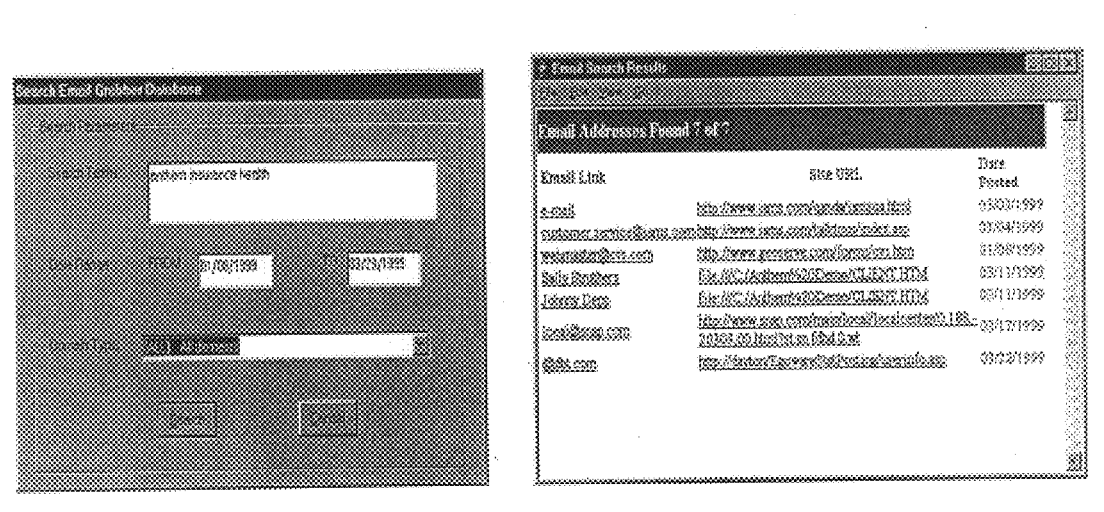

FIG. 12 is an illustration of a screen display of an E-mail searching component for the end-user to search the E-mail database by one or more search terms or by date and returns a display showing the information for all E-mail addresses found in the local E-mail database which satisfy the query. The end-user may click-on a displayed E-mail address and the browser will invoke the end-user's default E-mail program and go to that URL site. The end-user may choose to save the displayed E-mail search results to an E-mail search file. The end-user may choose to export the displayed E-mail search results to an ASCII comma-separated-value file for import by other applications or to another type of data file format.

Figure 13:
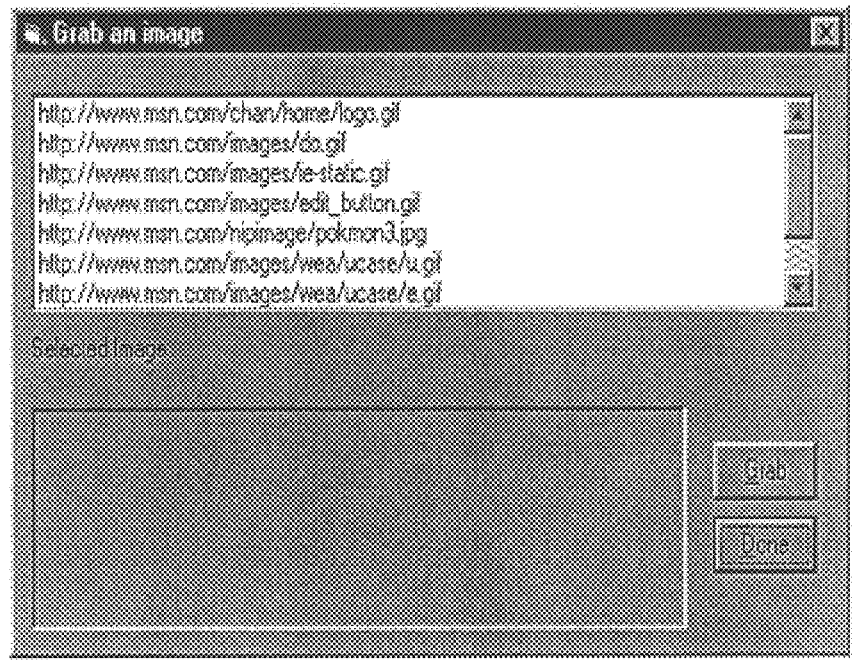
FIG. 13 is an illustration of a screen display of an image grabbing component in the browser for grabbing and saving images to an image database.
Figure 13A:
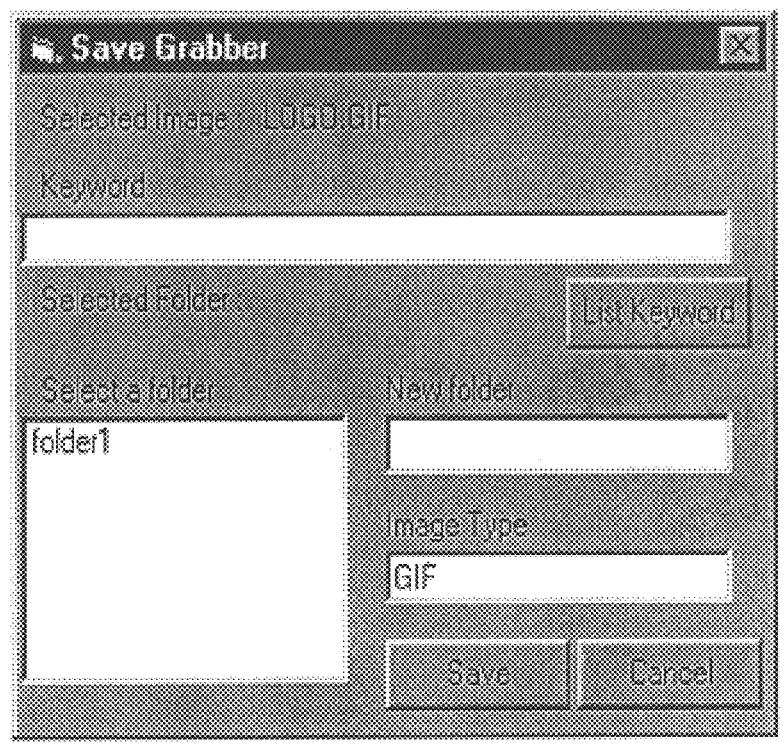
FIG. 13A is an illustration of an image save screen for entering data in the saved image database about the images grabbed and saved in the image grabbing component illustrated in FIG. 13.
Figure 13B:
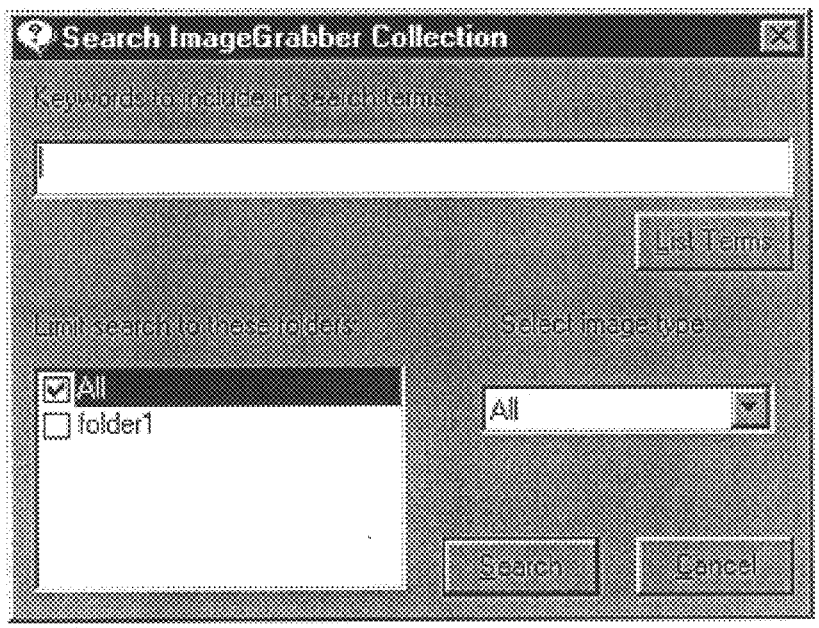
FIG. 13B is an illustration of an image search screen for searching for images in folders in the image database illustrated in FIG. 13.
Figure 13C:
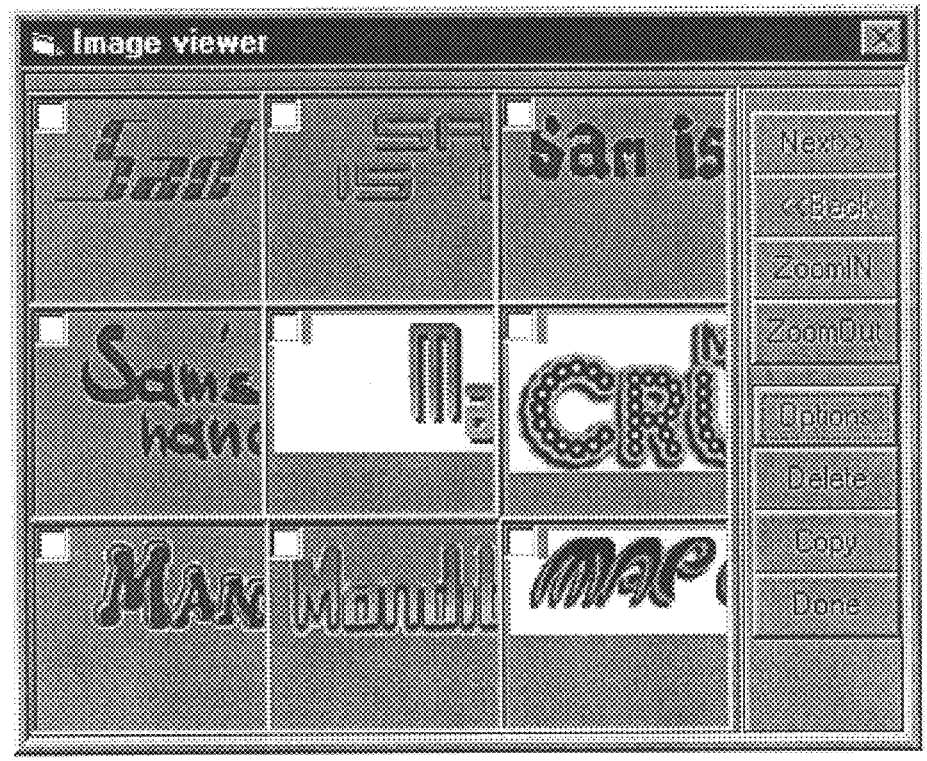
FIG. 13C is an illustration of an image search viewer showing thumbnail images of the images in the image database illustrated in FIG. 13.

FIG. 13 is an illustration of a screen display of an image grabbing component of the browser 8 which allows the end-user to select any displayed image, and save that image to a searchable local image database on the end-user computer 14. Images are typically .BMP, .JPG, .GIF, and other types of graphics files for which the .BMP and other extensions denote particular graphical formats, standards, or protocols. An image saver screen illustrated in FIG. 13A allows manual entry of end-user defined image associated keywords into each record for each image saved to the searchable local image database. The image file, end-user image associated defined keywords, an image associated URL of the page containing the image, Title of the page containing the image, and last modified date of the image associated URL, and the image associated keywords that appear in <META> tags of the page containing the image are saved to the local image database. Illustrated in FIG. 13B is an image searching component of the browser 8 for searching the local image database by one or more search terms. Illustrated in FIG. 13C is an image viewer that returns a display showing thumbnail graphic representations of any image that satisfies the end-user's search query of the image searching component. The end-user may select an image and display the image in the browser 8 or to save the image to another file.

A tour component of the browser 8 allows the end-user to identify one or more URLs and save them into a group called a tour and to create one or more such tours, and to save each tour to a searchable local tour database on the end-user computer 14 similar to the searchable local image database.

Figure 14:
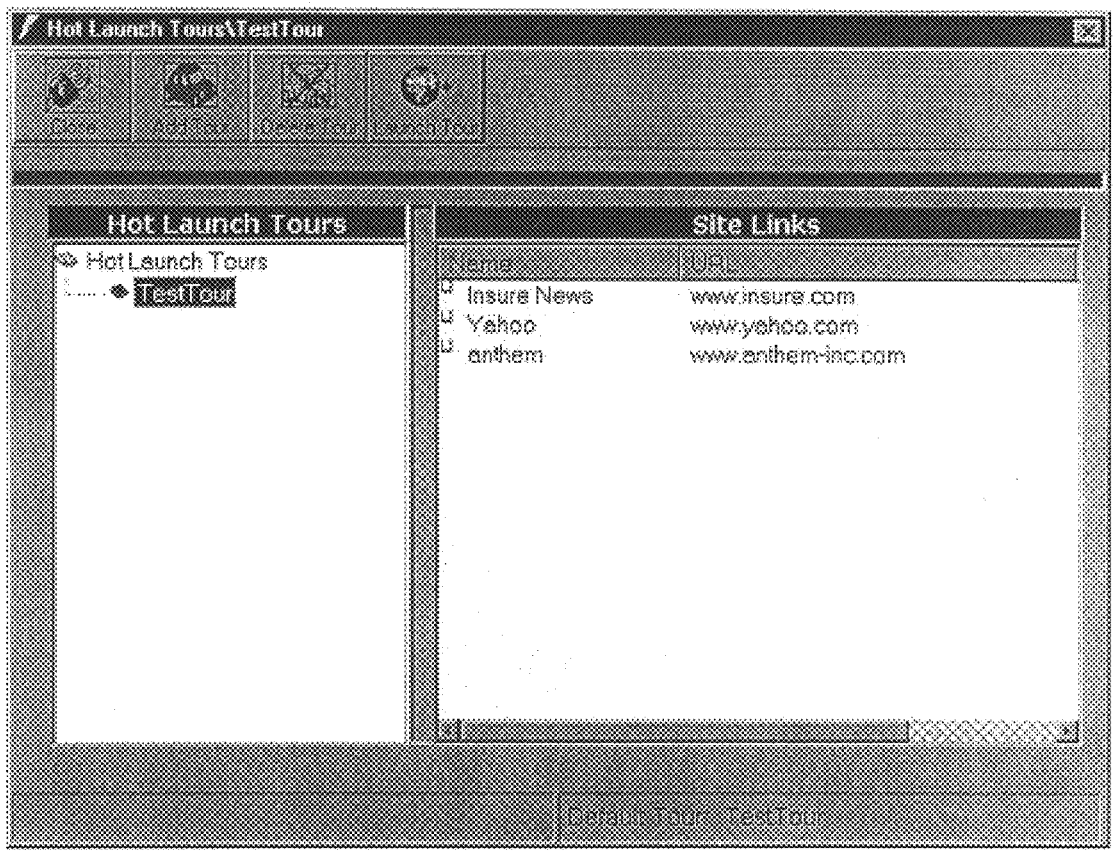
FIG. 14 is an illustration of a screen display of a tour component in the browser.

FIG. 14 is an illustration of a screen display of a hot launch code in the browser 8 for launching the tours. The end-user may choose a tour from the local tour database and edit, delete, or launch the selected tour. If the tour is launched, then, the browser will sequentially download each of the URLs included in the tour in a background process. When the download of URLs comprising a tour is complete, the first URL in the tour will be displayed in the browser. All of the URLs which have been downloaded will be added to a list and the end-user may choose an URL from that list and have the browser display the selected URL.

Figure 15:
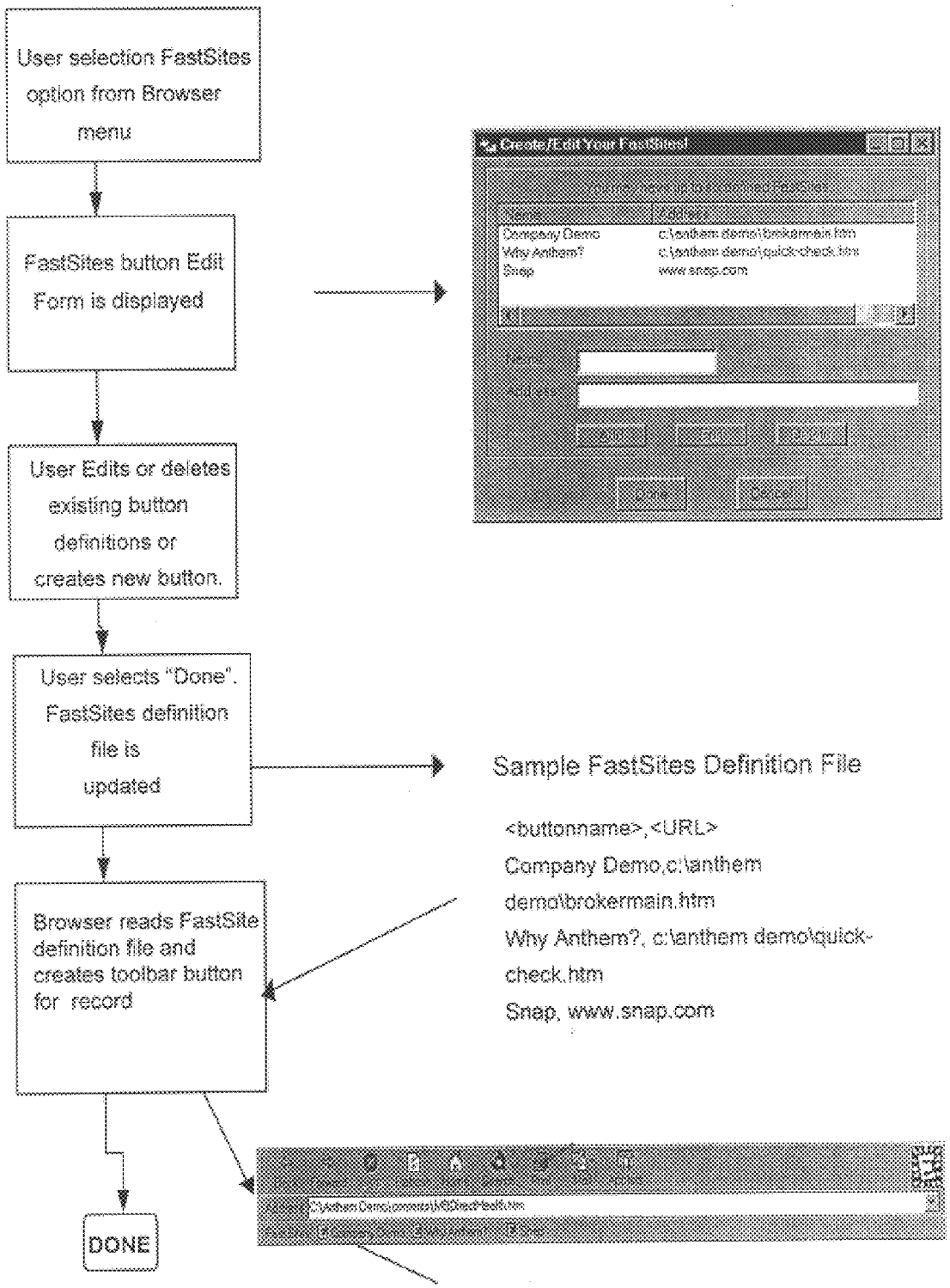
FIG. 15 is a flow chart illustrating a fast site component of the browser for allowing the end-user to modify the browser's main screen illustrated in FIG. 4 by adding fast site command buttons.

FIG. 15 is a flow chart illustrating a fast site component of the browser 8 for the end-user to modify the browser's main screen 64 (FIG. 4) by adding fast site command buttons 74 to the Command Bar 76 via a display for where the end-user enters a URL and a short descriptive name 78 to appear on the fast site command button and elects to save their entry. A button control is generated and added to the Command Bar 76 which, when pressed by the end-user, will cause the browser to retrieve the URL and display the resulting page in the browser. The end-user has the ability to add, modify and delete such fast site command buttons.

Figure 16:
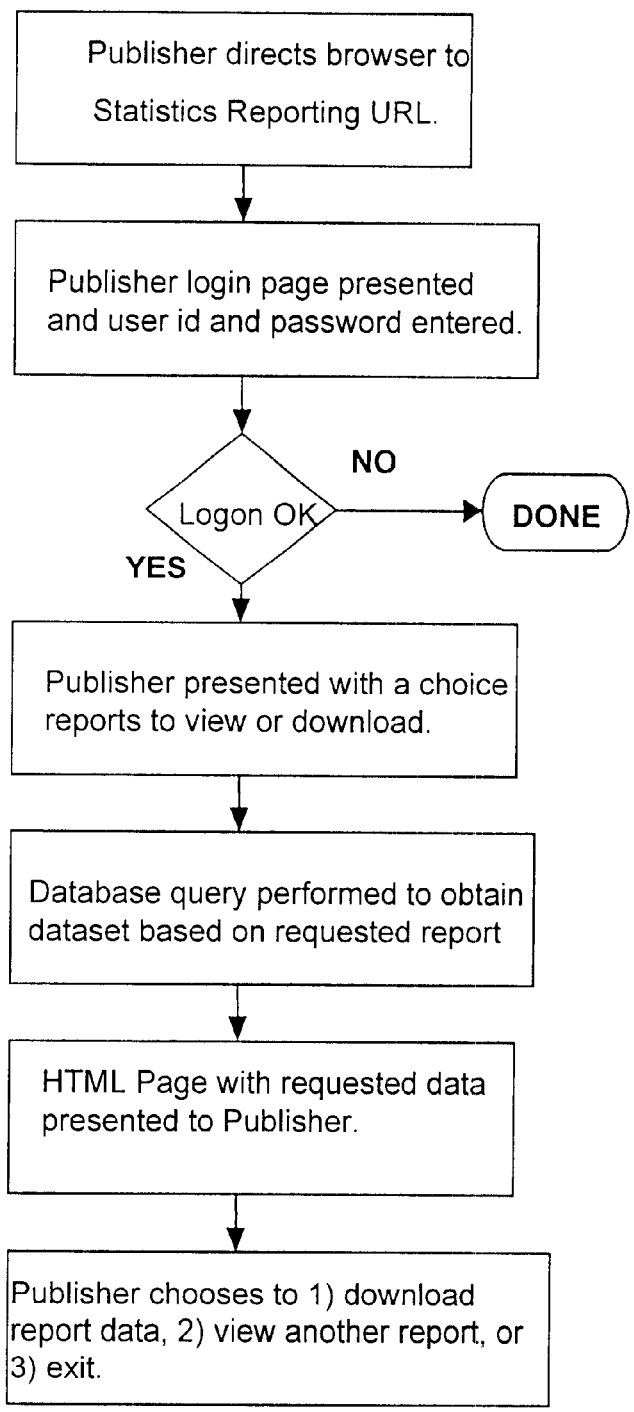
FIG. 16 is a flow chart illustrating a statistics reporting program of the Web browser system to allow the publisher to view reports and/or end-user statistics.
Figure 17:
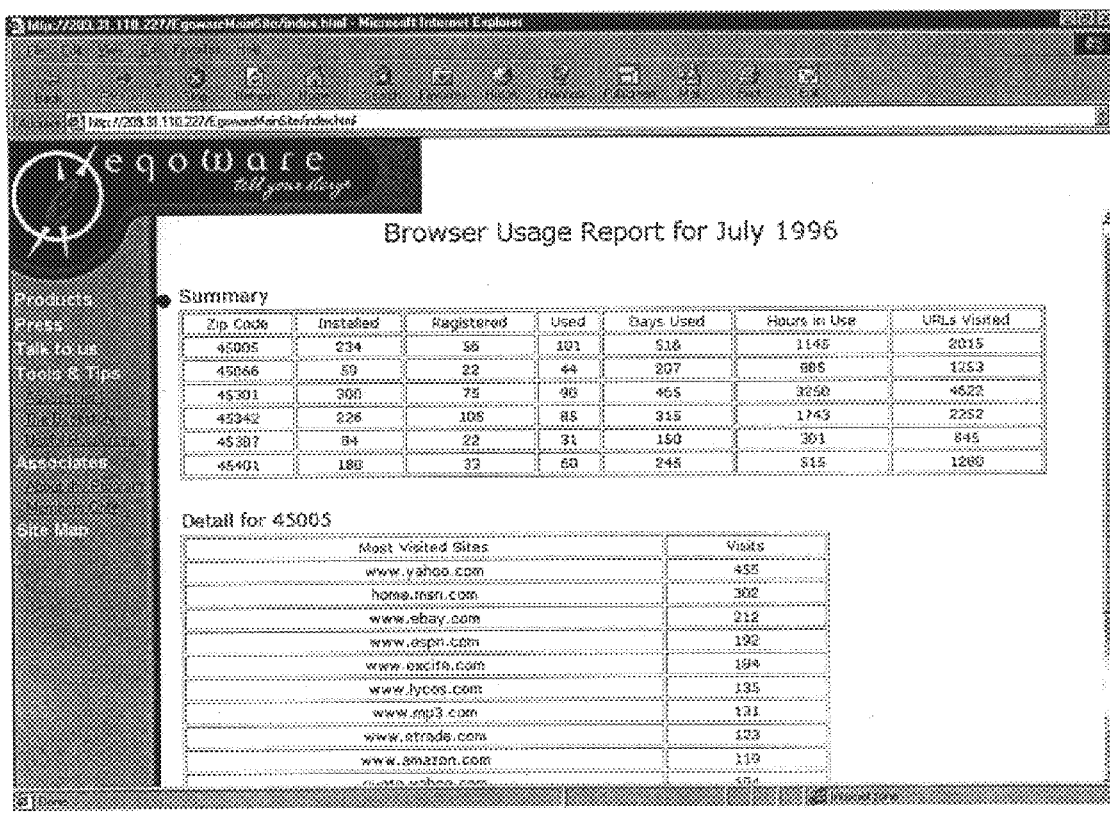
FIG. 17 is a sample screen illustrating reports of end-user statistics from the statistics reporting program in FIG. 16.

FIG. 16 is a flow chart illustrating a statistics reporting program of the Web browser system 10 for allowing publishers and other authorized users to view reports and/or download end-user statistic results from the local event statistics database 40 through the server 24. The publisher logs-on to the server 24 and requests access to the analysis program 44. The statistics reporting program uses the publisher's statistics database 48 located on the statistics server 45 to generate the data sets and publisher reports as illustrated in FIG. 17. The publisher reports are typically graphical representations, such as graphs, charts, and histograms of the event data for many end-users stored in the publisher's statistics database 48 local events statistics database. After the publisher logs-on, he is presented with a choice of pre-formatted statistical reports or data sets to view or download. The publisher performs a database query to obtain data sets and/or pre-formatted reports that are displayed in a HTML Page with the requested data. The query, typically, includes a unique publisher ID that allows access only to the data sets and pre-formatted reports that he is permitted to view, publisher's product ID, and a date range and returns. The data sets and reports are typically cumulative or individual user event statistics that may be aggregated by zip code. The reports and data sets may also include zip code, number of browsers 8 installed, number of total hours browsers 8 were used during the date range, number of HTML pages viewed during the date range, a listing of HTML pages viewed which may be further segregated by on-line or off-line usage.

Accordingly, what is desired to be secured by Letters Patent of the United States is the invention as defined and differentiated in the following claims:

1. Customized software stored in computer readable medium comprising:
   browser software for distribution by a publisher to be used by an end-user on an end-user's computer having a fixed storage means and interface with a network server using a network, said browser software comprising:
   a graphical user interface (GUI) component for controlling a browser on the end-user's computer, said GUI component stored on said fixed storage means;
   an installation software program operable to install said GUI component on the end-user's computer and said GUI includes means for displaying at least one customized screen display area on the end-user's computer which is customized for the publisher;
   publisher content that is at least partially installable on the end-user's computer;
   a means for monitoring end-user behavior and maintaining a local event statistics database of end-user behavior on the end user's computer; and
   a means for detecting a network connection and transmitting at least a portion of said local event statistics database to the network server.

2. Software as claimed in claim 1 wherein said publisher content comprises multi-media files.

3. Software as claimed in claim 2 wherein said end-user behavior includes end-user behavior on-line and when viewing locally stored files off-line.

4. Software as claimed in claim 3 further comprising a means for compiling summary information from said local event statistics database wherein said summary information comprises a portion of said local event statistics database.

5. Software as claimed in claim 2 wherein said monitoring end-user behavior and maintaining a local event statistics database includes monitoring and storing end-user event data related to end-user events.

6. Software as claimed in claim 5 wherein said end-user events include logging on to a URL and said end-user event data includes at least one of, said URL, a title, a last modified date, keywords located in a <META> tag, and submitted data via an HTML <FORM>.

7. Software as claimed in claim 6 wherein said submitted data further includes end-user data entered by the end-user in data fields and an entry date and an entry time said end-user event occurred.

8. Software as claimed in claim 7 further comprising an analysis program on the network server which receives and analyzes local event data from said local event statistics databases and stores results from said analysis program into a statistics database accessible through said network server.

9. Software as claimed in claim 8 wherein said analysis program includes a means for compiling summary information from said results.

10. Software as claimed in claim 9 wherein said summary information is in a graphical format.

11. Software as claimed in claim 5 further comprising a means for detecting a network connection and executing a transaction with the network server to determine if said publisher content should be modified.

12. Software as claimed in claim 11 further comprising a means for updating said publisher content that is installed on the end-user's computer.

13. Software as claimed in claim 12 wherein said means for updating said publisher content includes downloading new files from the network server and storing them on the end-user's computer and deleting existing files which are stored on the end-user's computer.

14. Software as claimed in claim 12 wherein said transaction with said network server includes transmitting at least one of a set of identifying data, said set of identifying data comprising a unique identifier for the browser, a unique identifier for the publisher, a zip code of the end-user, an area code of the end-user, a set of keywords, and end-user demographic data.

15. Software as claimed in claim 14 further comprising a search means for allowing the end-user to search the local events statistics database to locate Web pages which contain said keywords in a URL, Title, or as a keyword in a <META> tag.

16. Software as claimed in claim 14 further comprising a password manager means for allowing the end-user to save a script of a sequence of log-on keystrokes performed to log-in to a password secured URL, to save said script to a local script database, generate a log-in script from said saved script of a sequence of log-on keystrokes which the browser will run whenever it detects the end-user navigating to said password secured URL with a defined script, and automatically log the end-user in to said password secured URL.

17. Software as claimed in claim 16 further comprising a graphing means for providing a graphical representation of the end-user event data stored in the local events statistics database.

18. Software as claimed in claim 17 further comprising an E-mail grabbing means for automatically examining each URL loaded in the browser to locate E-mail addresses.

19. Software as claimed in claim 5 further comprising an E-mail grabbing means for automatically examining each one of URLs loaded in the browser to locate E-mail addresses and saving the E-mail address, the URL, the title of the page of the URL, the URL's last modified date, and any keywords present in a <META> tag of the URL to a searchable local E-mail database on the end-user's computer.

20. Software as claimed in claim 19 further comprising an E-mail interface for searching said local E-mail database with one or more search terms and displaying E-mail information for E-mail addresses stored in said local E-mail database which satisfy a query.

21. Software as claimed in claim 20 wherein the E-mail interface includes means for the end-user to click-on a displayed E-mail address and invoke a default E-mail program stored on the end-user's computer to send an E-mail to said displayed E-mail address.

22. Software as claimed in claim 21 wherein said E-mail interface further comprises a reporting means for saving said E-mail information to an E-mail file.

23. Software as claimed in claim 5 further comprising an image grabbing means for allowing the end-user to selectively save an image displayed on the end-user's computer and having an image associated URL in a searchable image database on the end-user's computer.

24. Software as claimed in claim 23 wherein said image grabbing means further comprises means to store a title of the page of the image associated URL, a last modified date of the image associated URL, and image associated keywords in a <META> tag of the image associated URL in said image database.

25. Software as claimed in claim 24 further comprising an image grabbing interface for searching said image database with one or more search terms and displaying said images in said image database which satisfy a query.

26. Software as claimed in claim 5 further comprising a touring means for allowing the end-user to selectively save tours, each tour comprising a plurality of URLs to a searchable tour database, said touring means further comprising a tour launching means for launching a selected one of said tours which will sequentially download each of said URLs included in said selected tour in a background process to have each of said sequentially downloaded URLs be displayed by the end-user.

27. Software as claimed in claim 5 further comprising a button means to install fast site command buttons to a command bar on a display screen of said browser by the end-user entering a URL and a short name to appear on said command buttons and elects to save their entry.

28. Software as claimed in claim 2 further comprising a content decoding means to allow the end-user to selectively view information about encrypted portions of said publisher content.

29. Software as claimed in claim 28 wherein said content decoding means further comprises password protection means for selectively decrypting and storing said encrypted portions upon the end-user's computer entering a password supplied by the publisher.

30. Software as claimed in claim 1 wherein said installation software program further includes means for installing a customized icon operable to launch said GUI component and viewable on a start-up screen on the end-user's computer and a means for updating said icon with updating instructions provided by a web server.

31. Software as claimed in claim 30 further comprising means for updating or changing said customized icon when the end-user's computer is connected to the server over the network which issues a set of updating instructions to the end-user's computer to update or change the icon.

32. Software as claimed in claim 30 further comprising updating means for detecting presence of a connection to the network during start-up of the browser software, executing a transaction to the server to determine if the icon should be modified, and means for updating or changing the customized icon when the end-user's computer is connected to the server over the network which issues a set of updating instructions to the end-user's computer to update or change the icon.

33. Software as claimed in claim 1 further comprising a means for changing a name of said browser that appears in a title bar of said browser on a viewable screen on the end-user's computer.

34. Customized software stored in machine readable medium comprising:
  browser software for distribution by a publisher to be used by an end-user on an end-user's computer having a fixed storage means and interface with a network server using a network, said browser software comprising:
  a graphical user interface (GUI) component for controlling a browser on the end-user's computer, said GUI component stored on said fixed storage means;
  an installation software program operable to install said GUI component on the end-user's computer and said GUI includes means for displaying at least one customized screen display area on the end-user's computer which is customized for the publisher;
  publisher content that is at least partially installable on the end-user's computer; and
  a means for monitoring end-user behavior and maintaining a local event statistics database of end-user behavior on the end-user's computer wherein said end-user behavior includes end-user behavior on-line and when viewing locally stored files off-line;
  wherein said end-user behavior includes end-user behavior on-line and when viewing locally stored files off-line.

35. A browser system comprising:
  an end-user computer;
  said end-user computer including a fixed storage means for fixedly storing files, a retrieving means for retrieving files from a removable storage means, and a network connecting means for connecting said end-user computer to a network;
  publisher's content stored on at least one of said fixed and removable storage means;
  browser software stored on said end-user computer, said browser software comprising:
  a graphical user interface (GUI) component for controlling a browser on the end-user computer, said GUI component stored on said fixed storage means;

said GUI component includes means for displaying at least one customized screen display area on the end-user computer which is customized for a publisher;

a means for monitoring end-user behavior and maintaining a local event statistics database of end-user behavior; and a means for detecting a network connection and transmitting at least a portion of said local event statistics database to said network server.

36. A browser system as claimed in claim 35 wherein said end-user behavior includes end-user behavior on-line and when viewing locally stored files off-line.

37. A browser system as claimed in claim 36 wherein said browser software further comprises means for detecting a network connection and transmitting at least a portion of said local event statistics database to said network server and said network server includes a means for storing said portion of said local event statistics database in a publisher's statistics database.

38. A browser system as claimed in claim 37 further comprising a reporting means stored and operable on a publisher's computer for accessing end-user information stored in said publisher's statistics database.

39. A browser system as claimed in claim 36 wherein said browser software further comprises means for detecting a network connection and transmitting at least a portion of said local event statistics database to said network server and said network server includes a means for analyzing said portion of said local event statistics database and storing results from said means for analyzing in a publisher's statistics database.

40. A browser system as claimed in claim 39 wherein said means for analyzing includes a means for compiling information from a plurality of local event statistics databases and storing said compiled information in said publisher's statistics database.

41. A browser system as claimed in claim 40 further comprising a reporting means stored and operable on a publisher's computer for accessing and retrieving said compiled information.

42. A browser system as claimed in claim 41 wherein said compiled information includes reports containing cumulative or individual user event statistics aggregated by at least one of a set of identifying data, said set of identifying data comprising a unique identifier for the browser, a unique identifier for the publisher, a zip code of an end-user, an area code of the end-user, a set of keywords, and end-user demographic data.

43. A browser system as claimed in claim 41 wherein said compiled information includes reports containing cumulative or individual user event statistics aggregated by zip code of a plurality of end-users.

44. Password managing software for use with a browser software and stored in machine readable format, said password managing software comprising:

a recording means for an end-user to record a script of a sequence of keystrokes performed to log-in to a password secured address on a computer system;

a means for saving the script to a local script database, a means for generating a log-in script from said script in said local script database which the browser software runs whenever the browser software detects the end-user navigating to the password secured address; and a means for automatically logging the end-user in to the password secured address.

45. The password managing software as claimed in claim 44 wherein the password secured address is a URL.

46. The password managing software as claimed in claim 45 in the computer system is a network.

47. The password managing software as claimed in claim 46 wherein the network is the Internet.

\* \* \* \* \*